US012253980B2

(12) United States Patent
Miller et al.

(10) Patent No.: US 12,253,980 B2
(45) Date of Patent: *Mar. 18, 2025

(54) DISTRIBUTED WORK DATA MANAGEMENT

(71) Applicant: Capital One Services, LLC, McLean, VA (US)

(72) Inventors: Walter Miller, Glen Allen, VA (US); Robert Martin, Glen Allen, VA (US); Bradley Smith, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,366

(22) Filed: Jan. 29, 2024

(65) Prior Publication Data
US 2024/0168927 A1 May 23, 2024

Related U.S. Application Data

(60) Continuation of application No. 17/451,863, filed on Oct. 22, 2021, now Pat. No. 11,886,389, which is a
(Continued)

(51) Int. Cl.
*G06F 21/00* (2013.01)
*G06F 16/182* (2019.01)
(Continued)

(52) U.S. Cl.
CPC .......... *G06F 16/1834* (2019.01); *G06F 21/64* (2013.01); *G06Q 10/0639* (2013.01);
(Continued)

(58) Field of Classification Search
CPC . G06F 16/1834; G06F 21/64; G06Q 10/0639; G06Q 20/065; G06Q 40/125;
(Continued)

(56) References Cited

U.S. PATENT DOCUMENTS 6,058,375 A 5/2000 Park
10,102,265 B1 10/2018 Madisetti et al.
(Continued)

FOREIGN PATENT DOCUMENTS

WO 2017145021 A1 8/2017

OTHER PUBLICATIONS

Ainsworth R.T., et al., "Payroll Tax the Blockchain," May 18, 2017, 32 pages. Retrieved from Internet: [URL: https://papers.ssrn.com/sol3/papers.cfm?abstractid=2970699].
(Continued)

*Primary Examiner* — Don G Zhao
(74) *Attorney, Agent, or Firm* — Harrity & Harrity, LLP

(57) ABSTRACT

A device may receive, from a user device, a transaction request associated with a first entity and identify a distributed ledger associated with the first entity, the distributed ledger including a set of blocks recording work data associated with the first entity. The set of blocks may include: a first subset of blocks including data specifying work performed by the first entity, and a second subset of blocks including data verifying a portion of the work performed by the first entity and specified by the data included in the first subset of blocks. The device may determine that a transaction, associated with the transaction request, is associated with the first subset of blocks and the second subset of blocks. Based on predetermined instructions that correspond to the transaction and the distributed ledger, the device may perform the transaction.

20 Claims, 7 Drawing Sheets

Related U.S. Application Data division of application No. 16/532,782, filed on Aug. 6, 2019, now Pat. No. 11,169,970, which is a division of application No. 16/001,818, filed on Jun. 6, 2018, now Pat. No. 10,409,783.

(51) Int. Cl.
| | | |
|---|---|---|
| *G06F 21/64* | (2013.01) | |
| *G06Q 10/0639* | (2023.01) | |
| *G06Q 20/06* | (2012.01) | |
| *G06Q 40/12* | (2023.01) | |
| *H04L 9/06* | (2006.01) | |

(52) U.S. Cl.
CPC ......... *G06Q 20/065* (2013.01); *G06Q 40/125* (2013.12); *H04L 9/0637* (2013.01)

(58) Field of Classification Search
CPC .............. G06Q 2220/00; H04L 9/0637; H04L 2209/56; H04L 9/3239; H04L 9/50; H04L 63/12
See application file for complete search history.

(56) References Cited

U.S. PATENT DOCUMENTS

| | | | |
|---|---|---|---|
| 10,409,783 B1 | 9/2019 | Miller | |
| 10,423,961 B1 | 9/2019 | El Defrawy et al. | |
| 10,496,850 B1 | 12/2019 | Lee et al. | |
| 10,713,712 B2* | 7/2020 | Bissonette | G06Q 20/105 |
| 11,145,017 B1* | 10/2021 | Wu | G06V 30/418 |
| 11,159,313 B2* | 10/2021 | Fletcher | H04W 12/06 |
| 11,169,970 B2 | 11/2021 | Miller et al. | |
| 11,651,082 B2* | 5/2023 | Gourisetti | G06F 21/64 726/25 |
| 11,651,360 B2* | 5/2023 | Kinnaird | H04L 67/10 705/71 |
| 11,663,595 B1* | 5/2023 | Houseworth | G06Q 20/405 705/71 |
| 11,682,095 B2* | 6/2023 | Coast | G06Q 10/10 705/28 |
| 11,704,726 B1* | 7/2023 | Philbrick | G06Q 30/08 705/14.71 |
| 11,748,337 B2* | 9/2023 | Manamohan | G06F 11/3055 707/703 |
| 11,886,389 B2* | 1/2024 | Miller | G06Q 20/065 |
| 2002/0048364 A1 | 4/2002 | Gligor et al. | |
| 2005/0246274 A1* | 11/2005 | Abbott | G06Q 40/12 705/40 |
| 2006/0202012 A1 | 9/2006 | Grano et al. | |
| 2016/0203477 A1 | 7/2016 | Yang et al. | |
| 2016/0330214 A1 | 11/2016 | Roth et al. | |
| 2017/0061396 A1 | 3/2017 | Melika et al. | |
| 2017/0206532 A1 | 7/2017 | Choi | |
| 2017/0213210 A1 | 7/2017 | Kravitz | |
| 2017/0232300 A1* | 8/2017 | Tran | G06F 1/163 434/247 |
| 2017/0316390 A1 | 11/2017 | Smith et al. | |
| 2018/0018723 A1 | 1/2018 | Nagla et al. | |
| 2018/0025442 A1* | 1/2018 | Isaacson | H04L 51/48 705/26.62 |
| 2018/0109541 A1 | 4/2018 | Gleichauf | |
| 2018/0115425 A1* | 4/2018 | Dechu | H04L 9/3239 |
| 2018/0144156 A1* | 5/2018 | Marin | G06F 21/6272 |
| 2018/0144340 A1* | 5/2018 | Kinnaird | G06Q 20/065 |
| 2018/0183600 A1* | 6/2018 | Davis | G06F 16/951 |
| 2018/0247191 A1 | 8/2018 | Katz et al. | |
| 2018/0262928 A1 | 9/2018 | Lewis et al. | |
| 2018/0264347 A1 | 9/2018 | Tran et al. | |
| 2018/0307859 A1 | 10/2018 | LaFever et al. | |
| 2018/0352033 A1 | 12/2018 | Pacella et al. | |
| 2018/0365691 A1 | 12/2018 | Sanders et al. | |
| 2019/0018888 A1 | 1/2019 | Madisetti et al. | |
| 2019/0102758 A1 | 4/2019 | Wright et al. | |
| 2019/0102839 A1 | 4/2019 | Kim et al. | |
| 2019/0158469 A1 | 5/2019 | Gonzalez | |
| 2019/0173667 A1* | 6/2019 | Wang | H04L 63/08 |
| 2019/0205884 A1* | 7/2019 | Batra | G06Q 20/4014 |
| 2019/0236594 A1 | 8/2019 | Ehrlich-Quinn | |
| 2019/0334715 A1 | 10/2019 | Gray | |
| 2019/0361917 A1* | 11/2019 | Tran | H04W 12/108 |
| 2019/0386969 A1 | 12/2019 | Verzun et al. | |
| 2020/0051076 A1* | 2/2020 | Cichocki | H04L 9/50 |
| 2020/0082361 A1* | 3/2020 | Chan | H04L 9/3247 |
| 2020/0118117 A1 | 4/2020 | McManus et al. | |
| 2020/0412731 A1 | 12/2020 | Gulbrandsen | |
| 2021/0027377 A1 | 1/2021 | Rohlfs | |
| 2021/0150512 A1* | 5/2021 | Yun | G06Q 20/0658 |
| 2024/0168927 A1* | 5/2024 | Miller | G06F 16/1834 |

OTHER PUBLICATIONS

Euros Evans, "Etch White Paper," Jun. 2017, 10 pages. Retrieved from Internet: [URL: http://www.etch.work/files/Etch_White_Paper.pdf].

Payplus., "Blockchain Payments and Payroll," Apr. 6, 2017, 8 pages. Retrieved from Internet: [URL:https://payplus.co.uk/blockchain-payments-andpayroll/].

Pymnts, "Where the Distributed Workforce Meets the Distributed Ledger," Mar. 29, 2016, 6 pages. Retrieved from Internet: [URL:https://www.pymnts.com/news/b2b-payments/2016/where-the-distributed-workforce-meets-the-distributed-ledger/].

Rennock M.J.W., et al. "Blockchain Technology and Regulatory Investigations," Practical Law, Mar. 2018, 11 pages.

Voell D., et al., "Quorum Whitepaper," Nov. 22, 2016, 8 pages. Retrieved from Internet: [URL:https://github.com/jpmorganchase/quorumdocs/blob/master/Quorum%20Whitepaper%20v0.1.pdf].

Young J., "Etch Launches Real-Time Blockchain-Based Payroll System," Sep. 18, 2017, 4 pages. Retrieved from Internet: [URL:https://coinjournal.neUsponsored-etch-real-time-blockchain-based-payroll-system/].

Zhu X, "A Payroll System Developed with React and Solidity for Ethereum," Feb. 8, 2018, 2 pages. Retrieved from Internet: [URL:https://github.com/Xuefeng-Zhu/payroll].

* cited by examiner

DISTRIBUTED WORK DATA MANAGEMENT

RELATED APPLICATIONS

This application is a continuation of U.S. patent application Ser. No. 17/451,863, filed Oct. 22, 2021 (now U.S. Pat. No. 11,886,389), which is a divisional of U.S. patent application Ser. No. 16/532,782, filed Aug. 6, 2019 (now U.S. Pat. No. 11,169,970), which is a divisional of U.S. patent application Ser. No. 16/001,818, filed Jun. 6, 2018 (now U.S. Pat. No. 10,409,783), which are incorporated herein by reference in their entireties.

BACKGROUND

Entities often employ individuals, organizations, and/or the like, to perform a variety of work on behalf of the employing entity. When employing an individual and/or organization to perform work, the manner in which the employing entity compensates the individual and/or organization may vary, e.g., based on an agreement between the employing entity and the individual and/or organization.

SUMMARY

According to some possible implementations, a method may comprise: receiving, by a device and from a first user device, work performance data, the work performance data including information specifying work performed by a first entity associated with the first user device; receiving, by the device and from a second user device, work verification data, the work verification data including information verifying the work performed by the first entity; determining, by the device, an amount of credit for the first entity based on the work performance data and the work verification data; performing, by the device, an action based on the amount of credit; identifying, by the device, a distributed ledger associated with the first entity; broadcasting, by the device, work data to a plurality of other devices for storage of the work data in the distributed ledger, the work data including: information identifying the work performed by the first entity, information identifying a second entity associated with the second user device, the amount of credit for the first entity, and a result of the action; receiving, by the device and from a third user device associated with the first entity, a transaction request associated with the distributed ledger; broadcasting, by the device and to the plurality of other devices, transaction information associated with the transaction request, the transaction information causing at least one of the plurality of other devices to: perform a transaction, and record the transaction in the distributed ledger; and providing, by the device, the third user device with transaction result data specifying a result of performing the transaction.

According to some possible implementations, a device may comprise: one or more memories; and one or more processors, communicatively coupled to the one or more memories, to: receive, from a first user device, work performance data, the work performance data including information specifying work performed by a first entity associated with the first user device; receive, from a second user device, work verification data, the work verification data including information verifying the work performed by the first entity; determine an amount of credit for the first entity based on the work performance data and the work verification data; identify a distributed ledger associated with the first entity; perform a first action based on executable instructions associated with the distributed ledger; store work data in the distributed ledger as one or more transactions, the work data including: information identifying the work performed by the first entity, information identifying a second entity associated with the second user device, the amount of credit for the first entity, and a result of the first action; determine that a condition specified by the executable instructions is satisfied; and perform, based on satisfaction of the condition, a second action based on the executable instructions.

According to some possible implementations, a non-transitory computer-readable medium storing instructions, the instructions comprising: one or more instructions that, when executed by one or more processors, cause the one or more processors to: receive, from a user device, a transaction request associated with a first entity; identify a distributed ledger associated with the first entity, the distributed ledger including a set of blocks recording work data associated with the first entity, the set of blocks including: a first subset of blocks, of the set of blocks, including data specifying work performed by the first entity, and a second subset of blocks, of the set of blocks, including data verifying a portion of the work performed by the first entity and specified by the data included in the first subset of blocks; determine that a transaction, associated with the transaction request, is associated with the first subset of blocks and the second subset of blocks; and perform the transaction based on predetermined instructions that correspond to the transaction and the distributed ledger.

DETAILED DESCRIPTION

Figure 1A:
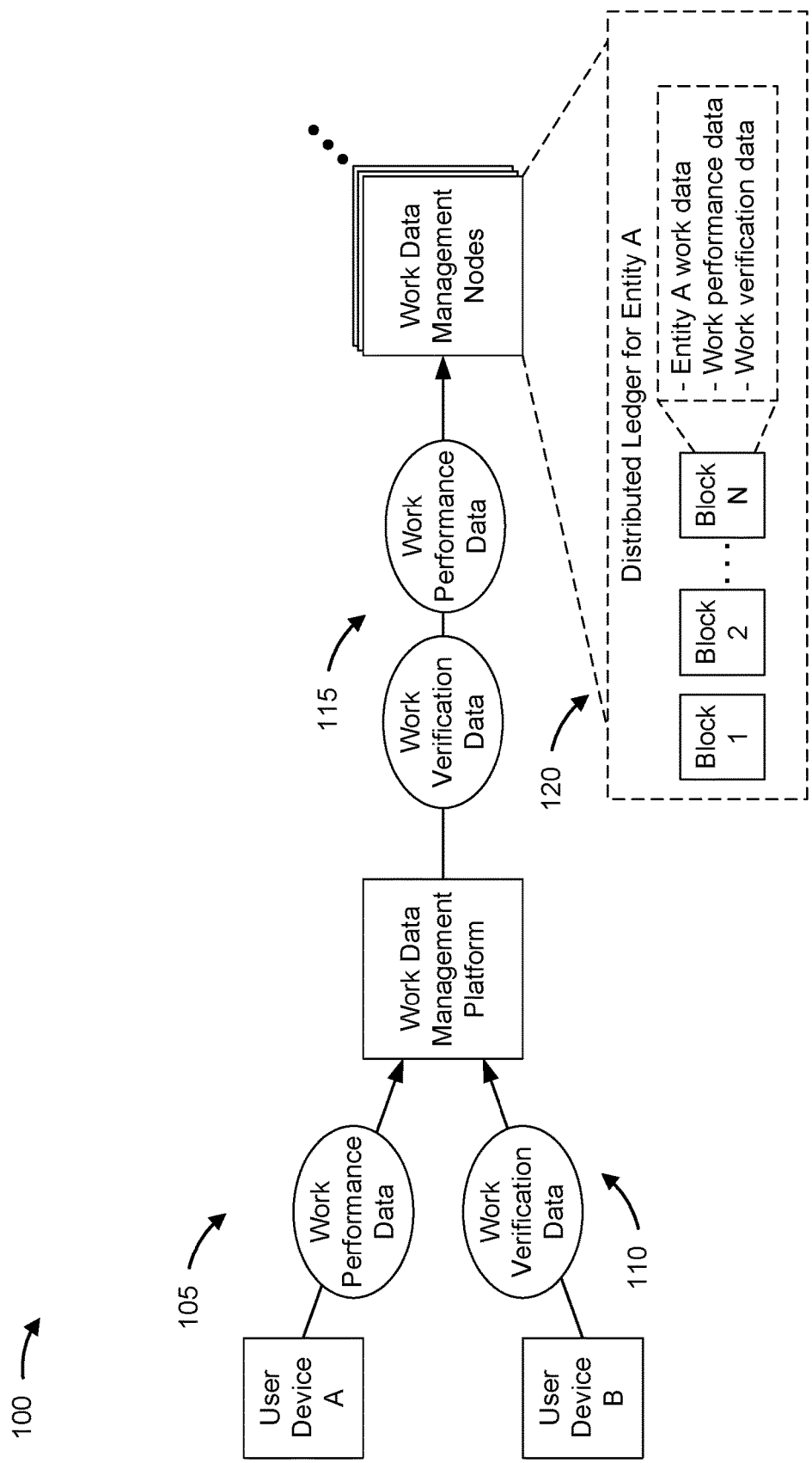
FIGS. 1A-1B are diagrams of an overview of an example implementation described herein.

The following detailed description of example implementations refers to the accompanying drawings. The same reference numbers in different drawings may identify the same or similar elements.

An entity that performs work, including an individual and/or organization (e.g., employee, contractor, corporation, and/or the like) is often compensated by another entity (e.g., an employing individual or organization) for products and/or services provided by the working entity to the other entity (e.g., the employing entity). Different types of work, and different forms of compensation, often result in relatively rigid compensation structures (e.g., bi-weekly compensation, bi-monthly compensation, compensation based on worker production and/or delivery, and/or the like) that are typically inflexible, complex, and labor-intensive to implement and/or change.

Some implementations, described herein, provide a work data management platform (e.g., a server computer, personal computer, cloud computing platform, and/or the like) to manage work data (e.g., data identifying work performed by a worker, compensation information, withholding information, and/or the like) in a manner designed to be flexible, secure, distributed, open, and automated. For example, the work data management platform may store work data for workers in distributed ledgers that are distributed throughout a network of work data management nodes (e.g., server computers, personal computers, and/or the like, such as blockchain nodes). Various actions may be taken by the work data management platform and/or work data management nodes, e.g., to facilitate the flexible, secure, distributed, open, and automated management of work data.

By way of example, the work data management platform may receive work performance data (e.g., hours worked, service(s) provided, product generated, and/or the like) from a user device associated with a first entity (e.g., an individual or an organization performing the work). A user device associated with another entity (e.g., an employer, third party, and/or the like) may provide the work data management platform with work verification data (e.g., data verifying that the work specified in the work performance data was performed). Based on the work performance data and the work verification data, the work data management platform may determine an amount of credit (e.g., compensation, in the form of currency or other incentive) to be associated with the first entity. For example, information included in the work performance data, work verification data, or included in other data accessible to the work data management platform, may specify an amount of credit due to the first entity for the work performed by the first entity.

The work data management platform may identify a distributed ledger associated with the first entity (e.g., based on information, such as a user identifier, included in the work performance data and/or work verification data) and broadcast work data to work data management nodes for storage of the work data in the distributed ledger. The work data broadcast to the work data management nodes may include a variety of information, such as information included in the work performance data, information included in the work verification data, the amount of credit determined for the first entity, and other information (e.g., information associated with actions that may have been taken by the work data management platform, such as withholding calculations, account distribution determinations, and/or the like).

The work data management nodes include executable instructions (e.g., a smart contract) designed to enable a work data management node that receives the work data to perform a variety of actions. For example, the work data management node may store the work data in blocks of a blockchain associated with the first entity, e.g., work performance data may be included in a work performance block (e.g., a block of data designed to store information related to the performance of work by the first entity), and work verification data may be included in a work verification block (e.g., a block of data designed to store information related to verification of work performed by the first entity). The distributed ledger may be accessible to a variety of parties, including the first entity, the employing entity, and other authorized entities (e.g., as specified by the first entity), such as entities associated with tax withholdings, payroll management, bank accounts, investment accounts, and/or the like.

The work data management platform may receive a transaction request associated with the first entity and facilitate the performance of a transaction specified in the request. The transaction request may include, for example, a request for distribution of credit to a bank account associated with the first entity, a request for payment of taxes on behalf of the first entity, a request for work data statistics for an employer's payroll provider, and/or the like). In some implementations, the work data management platform may perform the transaction (e.g., by obtaining the data required for the transaction from the work data management nodes), and in some implementations, the work data management platform may provide the work data management nodes with data needed to perform the transaction. Data associated with the transaction may also be stored in the distributed ledger.

In this way, the work data management platform may facilitate the management of work data in a manner designed to be flexible, secure, distributed, open, and automated. For example, flexibility is provided by enabling various aspects of executable instructions (e.g., instructions executed by the work data management platform and/or work data management nodes, such as smart contracts) to be configured by various parties associated with a worker, leading to a variety of different types of transactions and configurations to be handled by the work data management platform. Security is provided by implementing various forms of authentication, restricting access to a worker's distributed ledger (e.g., the worker's blockchain) to particular parties. Additionally, the distributed ledger may improve security, and preserve an immutable record of work data, by using cryptographic links between blocks of the distributed ledger, e.g., reducing the potential for unauthorized tampering with work data. The use of a distributed ledger improves security and transaction accuracy in implementations where a consensus between work data management nodes provides assurance that transactions are consistent and correctly performed. A distributed implementation also provides failover protection, in that the work data management platform may continue to operate in a situation where one or more work data management nodes fail. The open implementation makes distributed ledger data openly available to authorized parties, facilitating access to the work data in a manner designed to be open to at least some of the parties associated with the distributed ledgers.

Several different stages of the process for managing work data are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. Finally, automating the process for managing work data conserves computing resources (e.g., processor resources, memory resources, and/or the like) that would otherwise be wasted by using multiple different types of devices with different software, protocols, and configurations, and computing resources that would otherwise be wasted correcting problems that would arise from lack of consistency in the application of various transactions related to work data.

Figure 1B:
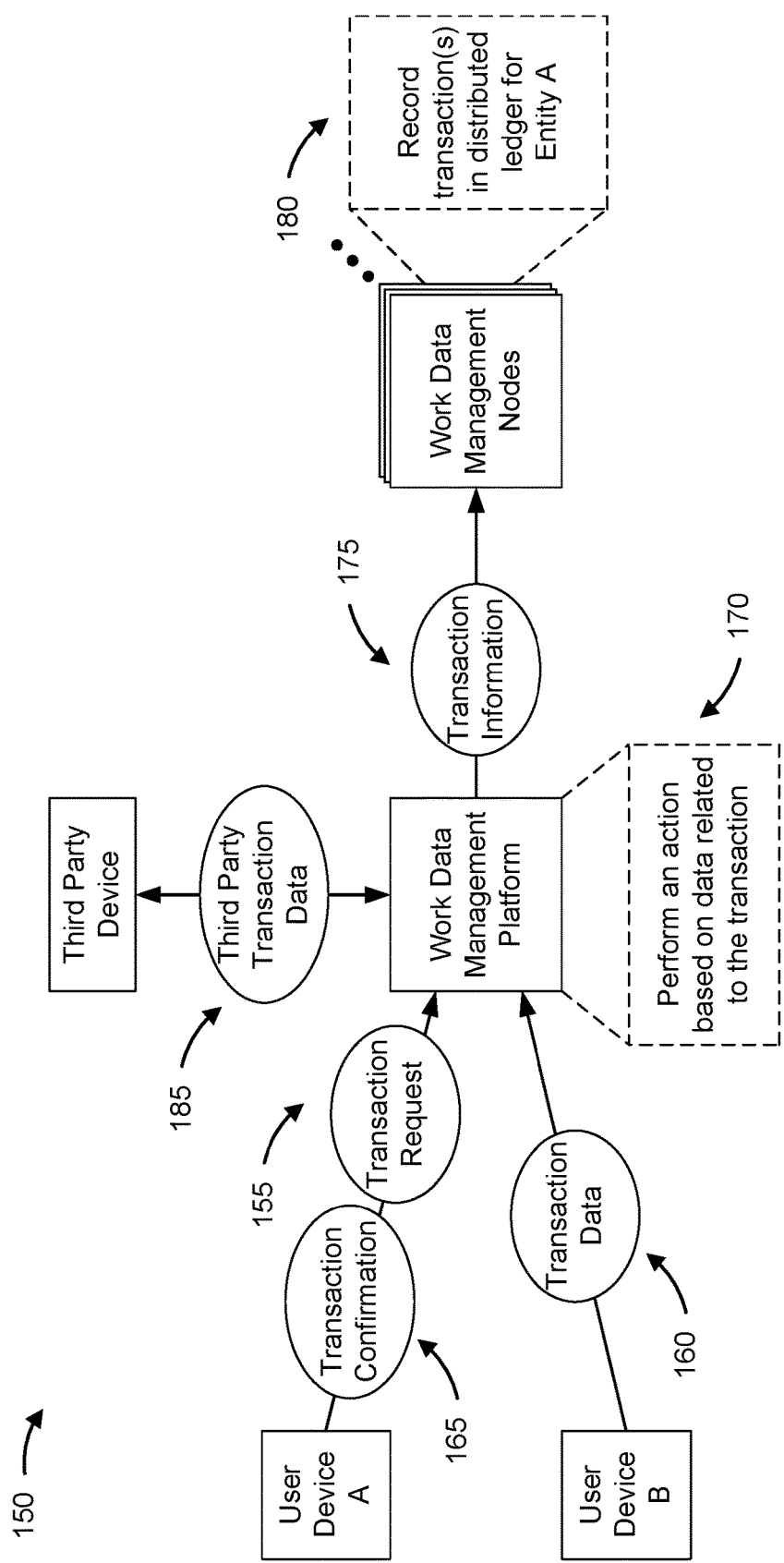

FIGS. 1A-1B are diagrams of an overview of an example implementation 100 described herein. As shown in FIG. 1A, example implementation 100 includes two user devices (e.g., personal computers, mobile devices, server computers, and/or the like), user device A and user device B; a work data management platform (e.g., a server computer, a cloud computing platform, and/or the like); and work data management nodes (e.g., personal computers, server computers, and/or the like, included in a network of distributed computing nodes, such as a blockchain-based implementation). While the devices of implementation 100 are depicted separately, in some implementations, the functionality of one or more of the devices of implementation 100 may be included in another device, or may be included in multiple, distributed devices.

As shown by reference number 105, the work data management platform receives work performance data from user device A. User device A may be a user device associated with an entity that performs work, or a working entity (e.g., an employee, an individual contractor, contracting organization, corporation, and/or the like). The work performance data may include a variety of information related to work performed by the working entity. For example, work performance data may specify a number of hours worked, a service that was performed, a product that was provided, and/or the like. Work data may also include other information related to the work that was performed, such as timing data indicating the time the work was performed, a party for whom the work was performed, data identifying the working entity (e.g., a user identifier, distributed ledger identifier, and/or the like), and/or the like.

The work performance data may be received by the work data management platform in a variety of ways. For example, work data management platform may include or otherwise be associated with an application server associated with an application operating on user device A. In this situation, the work performance data may be submitted to the work data management platform through the application (e.g., a web browsing application, dedicated work data management application, and/or the like). Work performance data may be provided to the work data management platform on demand (e.g., as the work is performed/reported), as part of a streaming application, and/or in batches of work data (e.g., a batch of work performance data from one working entity, a batch of work performance data associated with multiple working entities, and/or the like).

By way of example, user device A may be a mobile device associated with a private driver working as a contractor that is paid by an employer for providing a service (e.g., providing driving services for individuals). The mobile device may include an application associated with the employer, which is used by the private driver to provide rides to individuals. At the conclusion of a ride, work performance data may be provided to the work data management platform (e.g., automatically triggered by the application or by the employer, manually provided through the same application or a different application, and/or the like). In this way, the work data management platform may receive work performance data.

As shown by reference number 110, the work data management platform receives work verification data from user device B. User device B may be a user device associated with an entity that verifies work, or a verifying entity (e.g., an employer, an individual or organization for whom work is performed, and/or the like). The work verification data may include a variety of information used to verify work performed by the working entity. For example, work verification data may include data identifying the working entity, data identifying the work performed, data designed to be used to authenticate the verifying entity, and/or the like.

As with the work performance data, the work data management platform may receive the work verification data in a variety of ways. For example, an application operating on user device B may be used to provide the work verification (e.g., in a manner similar to providing work performance data). In some implementations, user device B may provide the work verification data in response to a request for verification (e.g., a request sent by work data management platform and/or a user device associated with the working entity). For example, in response to a condition being met (e.g., receipt of work performance data, passage of a certain period of time, accrual of a particular amount of credit or compensation due to a working entity, and/or the like), the work data management platform may send a request to a device associated with the verifying entity, in a manner designed to enable the verifying entity to provide work verification data indicating that work was performed.

By way of example, user device B may be a server computer associated with an employer of the private driver in the example, above. The server computer may operate an application designed to receive (e.g., from the passenger or a device associated with the passenger for whom the private driver provided a ride) data indicating that the private driver completed work (e.g., completed the ride) and, in response to receiving that indication the server computer may send work verification data to the work data management system. As another example, the work data management system, upon receipt of work performance data, may request work verification data from a device associated with the employing entity. In this situation, the work data management system may provide the employing entity with data identifying the working entity and/or the work performance data in need of verification.

In this way, the work data management platform may receive work verification data designed to verify work performance data. While implementation 100 depicts two separate devices associated with two different entities as separately providing work performance data and work verification data, in some implementations, the work performance data and work verification data may be provided by the same entity and/or provided by a single device. For example, an employer may provide (e.g., via a user device associated with the employing entity) work performance data and work verification data in a single communication to the work data management platform.

As shown by reference number 115, the work data management platform provides the work performance data and the work verification data, collectively referred to as "work data," to the network of work data management nodes, in a manner designed to enable the work data management nodes to perform a variety of actions. In some implementations, the work data management nodes may be implemented as a public or private network of blockchain nodes, and the nodes may be implemented by an employing entity, third party entity (e.g., a banking entity, government entity, and/or the like), or another entity permitted to operate a work data management node. In some implementations, the work data management platform may provide all or a portion of the work data, enabling the work data management nodes to use any or all of the information included in the work data. In some implementations, the work data management platform may provide only a portion of the work data, such as the portions of the data that are required to perform certain actions.

In some implementations, the work data management platform may provide the work data management nodes with the work data by broadcasting the work data to the work data management nodes, enabling a work data management node to claim the work data and perform one or more actions based on the work data. In this situation, the broadcast may be selective, e.g., only broadcast to a particular subset of work data management nodes, in a manner designed to ensure that particular work data management nodes are receiving the work data. For example, in a private blockchain implementation, work data may only be broadcast to a pre-approved set work data management nodes, such as work data management nodes associated with a particular working entity, employing entity, verifying entity, banking entity, government entity, and/or the like. In this situation, the work data management platform may use a mapping, lookup service, and/or other method, to determine which work data management nodes to broadcast work data to (e.g., based on working entity identifier, employer entity identifier, instructions included in work performance data and/or work verification data, and/or the like).

By way of example, work performance data received by the work data management platform may include an employer identifier that identifies an employing entity (e.g., the entity from which some form of credit, or compensation, may be expected). Using the employer identifier (e.g., alone or in combination with other information, such as an identifier associated with the working entity), the work data management platform may identify a subset of the work data management nodes that are approved for handling the work performance data, such as a set of work data management nodes that are associated with the employing entity (e.g., work data management nodes that are managed by the employing entity, a payroll provider associated with the employing entity, government organization associated with the employing entity, and/or the like). Work data management nodes capable of handling work verification data associated with the work performance data may be identified in the same or similar manner. In this way, the work data management platform may facilitate the use of private networks of work data management nodes, which may enable customization in the manner in which the work data is handled (e.g., executable instructions, or smart contracts, associated with the work data management nodes may differ between private networks of work data management nodes).

As shown by reference number 120, the work data management nodes perform an action based on the received work data (e.g., the work performance data and/or the work verification data). Each work data management node includes executable instructions (e.g., a smart contract) that cause the work data management node to perform one or more actions based on the executable instructions and the data received by the work data management node. A variety of actions may be performed and, as noted above, the actions may differ from one network of work data management nodes to another (e.g., from one smart contract blockchain implementation to another).

For example, a work data management node may store a portion or all of the work data in a distributed ledger (e.g., a blockchain) associated with the working entity identified in the work data. In some implementations, each working entity is associated with a corresponding distributed ledger, where each block of data stored in the distributed ledger includes work data. For example, a distributed ledger may include blocks for work performance data, blocks for work verification data, and blocks for other types of information relevant to the working entity, such as blocks for storing deposit account information for the working entity, withholding information for the working entity, vacation accrual for the working entity, and/or the like. In some implementations, one type of block may be used in a distributed ledger, and each block may include all relevant information and work data for a working entity. In this situation, as work data is added to the blockchain, new blocks are added with updated information regarding the working entity.

By way of example, using the private driver example above, a work data management node may receive work performance data that identifies the private driver, identifies work performed by the driver (e.g., a ride), and that identifies an employing entity (e.g., the entity responsible for providing the private driver with some type of credit, or compensation, for performing the work. The work data management node may use the data identifying the private driver to identify a distributed ledger associated with the private driver, identify a most recently added block of information, and add a new block of work data linked to the previous most recently added block of information. The link back to the previous block may be a cryptographic link that is capable of being used to verify the integrity of the new block and previous blocks of data included in the distributed ledger. The work data management node may include, in the new block, the work performance data. After storing the work performance data, the work data management node may receive work verification data that identifies the private driver, identifies the work performed by the driver (e.g., the ride, identified using a block identifier associated with the new block, or another form of identification, such as a ride identifier), and identifies the employing entity. In this situation, the work data management node may store a second new block in the distributed ledger, the second new block including the information indicating that the new block is verified.

In some implementations, the executable instructions included in a work data management node may cause the work data management node to create blocks from a predefined set of block types. For example, a block may correspond to a particular period of time (e.g., blocks that represent 1 minute, 10 minutes, 15 minutes, 1 hour, 1 day, 1 week, and/or the like, of work), a particular service (e.g., a first type of service, a second type of service, a third type of service, and/or the like), a particular product (e.g., a first type of product, a second type of product, a third type of product, and/or the like), or a similar unit of work for which work data may be recorded and compensated. Other types of blocks, such as blocks for vacation time, bonuses, or leave, or special blocks for beginning and end of employment, may also be used, as determined by the executable instructions included in the distributed ledger. By recording and verifying work in a granular manner (e.g., as in the example blocks described above), a working entity may receive credit (e.g., compensation) as soon as blocks have been verified, obviating the need for a typical "payday" or other traditional distribution of credit for work performed.

Other example actions may be performed by a work data management node based on the receipt of work data. For example, the executable instructions included in a work data management node may cause the work data management node to determine an amount of credit due to the working entity for performance of work. The amount of credit may be based on the executable instructions (e.g., a predetermined credit, or wage, specified in the executable instructions) and/or based on information included in the work data (e.g., work verification data may include data verifying an amount of credit to be due to the working entity). In some implementations, the amount of credit may be in the form of currency, such as an identifiable amount of a particular currency, or an amount of cryptographic currency (e.g., Bit Coin, Ether, Tether, and/or the like). As another example, the work data management node may perform withholding calculations on behalf of the working entity. Withholding calculations may include, for example, calculations of various taxes or other amounts of credit that might be associated with another party (e.g., government imposed income taxes, retirement account withholding, wage garnishment, and/or the like). The work data management node may, in some implementations, determine an amount of credit to distribute to various accounts, including accounts associated with the working entity. For example, credit distributions may involve identifying various deposit accounts associated with the working entity and assigning, to the various deposit accounts, a portion of the credit due to the working entity. Another example action may include calculating vacation time accrued by the working entity based on the work performed by the working entity. For example, a working entity may accrue vacation time credit based on hours worked, and the work data management node may include executable instructions that enable the calculation of the amount of vacation time credit accrued by the working entity.

In some implementations, an action may include notifying a third party regarding work data. For example, a payroll management system associated with the employing entity associated with working data may be notified regarding work performance data and/or work verification data, a government tax entity may be provided with information identifying credit due and/or provided to the working entity, a banking entity associated with the working entity and/or the employing entity may be provided with information regarding amounts due to the working entity, and/or the like. In some implementations, the work data management node that performs an action may store information regarding that action in a block of the distributed ledger associated with the working entity. In a situation where a work data management node modifies the distributed ledger (e.g., by adding a block), the work data management node may broadcast the modification to other work data management nodes, enabling other work data management nodes to confirm the action(s) taken by the work data management node and store corresponding information in copies of the distributed ledger. Other actions, in addition to or alternatively to those provided above, may also be performed by the work data management nodes in a manner designed to enable the management of work data in a variety of ways.

While the example actions above are described as being performed by a work data management node, in some implementations, the work data management platform may perform one or more of the actions described above, alone or in combination with the work data management nodes. By way of example, the work data management platform may perform withholding calculations and account distribution determinations, and provide information regarding the results of the actions to the work data management nodes for storing the information in the distributed ledger associated with the working entity.

As a result of operations performed by the work data management platform and/or work data management nodes described in implementation 100, the work data management platform may enable the storage of a distributed ledger for a working entity, which may be used to record an immutable record of work performed by the working entity and verified by an employer or other verifying entity. The working entity may accrue credit for the work performed (e.g., credit in crypto-currency stored in the distributed ledger), and various actions may be performed based on the work data, including the making withholding calculations, distributing credit between accounts associated with the working entity, and/or the like. The foregoing features enable a working entity to be quickly compensated for work performed, and the compensation may be quickly handled in a flexible and automated manner, allowing a working entity to receive payment quickly, to appropriate accounts, while appropriately accounting for various withholdings, and in a manner that is secure while also open to all parties involved. In addition, the use of the work data management platform and work data management nodes enables various transactions to be performed as a part of the work data management process, as described in further detail, below.

As shown in FIG. 1B, example implementation 150 includes user devices, the work data management platform, work data management nodes, and a third party device (e.g., a personal computer, server computer, and/or the like). Example implementation 150 depicts an example transaction associated with work data managed by the work data management platform. The example transaction, described in further detail, below, may include any of the actions described above as being performed by the work data management platform and/or work data management nodes. While example implementation 150 depicts the performance of a transaction based on a transaction request, in some implementations, transactions may be performed automatically (e.g., based on satisfaction of a condition specified by executable instructions associated with a distributed ledger).

As shown by reference number 155, the work data management platform receives a transaction request from user device A. For example, user device A may be operated by a working entity, and the transaction request may include a request to perform a particular transaction associated with the working entity's distributed ledger. As noted above, a transaction may include any of the actions described above with reference to implementation 100, such as a calculation of withholdings, a distribution of credit among one or more user accounts associated with the working entity, and/or the like. Other example transactions may include requesting verification of work performance data, providing credit (e.g., currency) to a deposit account specified in a transaction request, converting currency from one type of currency to another, calculating and/or using vacation time, updating work data stored in the distributed ledger, and/or the like.

The work data management platform may receive the transaction request in a variety of ways. In some implementations, the work data management platform may receive the transaction request in a manner similar to that in which the work data management platform receives work performance data and/or work verification data. For example, the work data management platform may receive the transaction request via an application operating on user device A and hosted by, or otherwise accessible to, the work data management platform.

By way of example, using the private driver example above, the private driver may wish to have credit distributed to a bank account from credit associated with the private driver in the distributed ledger associated with the private driver, e.g., the credit being based on work that was performed by the private driver and verified by an employing entity or other entity. In this situation, the private driver may use an application installed on the private driver's mobile device to send the work data management platform a request to deposit a particular amount of credit to a particular bank account associated with the private driver.

In some implementations, the work data management platform may send a request for transaction data to another device based on the received transaction request. For example, in a situation where the transaction request includes a request to deposit credit for work performed by the working entity, and the work has not yet been verified, the work data management platform may send, to a device associated with an entity capable of verifying the work, a request for verification of the work.

As shown by reference number 160, the work data management platform receives transaction data from user device B, e.g., a device associated with a verifying entity and/or employing entity. The transaction data may include information designed to facilitate and/or verify a transaction. For example, in a situation where the transaction request includes a request to disburse credit associated with the working entity to a deposit account associated with the working entity, the transaction data may include information relevant to performing the transaction, such as an account identifier associated with an account from which credit will be taken (e.g., a bank account associated with an employing entity), authorization information authorizing transfer of credit, and/or the like. As another example, transaction data may include information identifying an action that has already taken place, such as information identifying a transaction between an employing entity's bank account and the working entity's bank account. In this situation, the transaction data may be used to confirm that the working entity received credit for work performed by the working entity.

As shown by reference number 165, the work data management platform receives transaction confirmation data from user device A. The transaction confirmation data may include information designed to confirm that a transaction occurred. For example, in a situation where at least a portion of the transaction occurred without the use of the work data management platform (e.g., a bank transfer directly between an employing entity and a working entity), the transaction confirmation data may include information designed to confirm that at least a portion of the transaction occurred (e.g., data confirming a bank account transfer).

As shown by reference number 170, the work data management platform performs an action based on the data related to the transaction, such as the transaction request, the transaction data, and/or the transaction confirmation data. In some implementations, the work data management platform performs the transaction specified in the transaction request. For example, the work data management platform may communicate with one or more third party devices to facilitate the transfer of funds from one bank account to another. In some implementations, the work data management platform provides transaction information (e.g., a portion or all of the information included in the transaction request, transaction data, and/or transaction confirmation data) to at least one of the work data management nodes, enabling a work data management node to perform one or more actions based on the transaction information.

For example, the work data management platform may perform one or more actions designed to perform the transaction specified in the transaction request. Example actions associated with transactions may include a withholding calculation (e.g., contacting third parties regarding withholding of taxes, insurance, retirement account, garnishment, and/or the like), which may also include a transfer of currency (e.g., by contacting entities associated with accounts of the parties entitled to a portion of withholdings, or by transferring crypto-currency directly via the work data management nodes); a distribution of credit to one or more accounts associated with the working entity (e.g., causing transfer of currency to one or more deposit accounts specified in the transaction request); a currency conversion (e.g., from crypto-currency stored by the work data management nodes to a currency associated with the working entity deposit accounts or a currency associated with a third party that receives currency from a transaction); a query for information (e.g., to read from the distributed ledger associated with the working entity, rather than cause any specific change to work data) that may be submitted to the work data management nodes, a response to which may be provided to the entity requesting the transaction; or a correction of information included in the distributed ledger (e.g., in a situation where a mistake occurred in the submission of work performance data, work verification data, and/or the like). Other actions that might be relevant to managing work data associated with a working entity may be performed by the work data management platform, e.g., based on receiving a transaction request.

By way of example, using the private driver example above, the work data management platform may perform a variety of actions based on receiving a request to deposit funds into an account associated with the private driver. The work data management platform may authenticate the request, e.g., using authentication data (e.g., username, password, two-factor authentication data, and/or the like) included in or otherwise associated with the transaction request. The work data management platform may request transaction data (e.g., from user device B or from a separate storage device accessible to the work data management platform), which may include information identifying a source account from which funds are to be withdrawn. The work data management platform may request tax withholding information from a third party device, and use the tax withholding information to determine an amount of taxes to withhold from a deposit, and which may be deposited in a separate account associated with the entity to which the taxes are due. The work data management platform may identify a deposit account associated with the private driver (e.g., included in the transaction request data or obtained from information stored by or otherwise accessible to the work data management platform). The work data management platform may cause a transfer of currency (e.g., crypto-currency) to occur from the account from which funds are to be withdrawn (e.g., an employer's crypto-currency account, records of which may be maintained by the work data management nodes), to an account associated with the private driver (e.g., a crypto-currency account, records of which may be maintained by the work data management nodes). The work data management platform may cause a currency conversion to occur by using a third party device to exchange crypto-currency for the currency requested by the private driver (e.g., based on a default configuration and/or specified in the transaction request). The work data management platform may then deposit the currency into a deposit account associated with the private driver (e.g., by communicating with a banking entity associated with the private driver). Lastly, in this example, the work data management platform may provide a work data management node with information designed to enable the work data management node to record transaction information in the distributed ledger associated with the private driver.

As shown by reference number 175, the work data management platform provides transaction information to a work data management node. For example, the work data management platform may broadcast the transaction information to a network of work data management nodes, such as a network of work data management nodes associated with a particular entity (e.g., working entity, employing entity, verifying entity, and/or the like).

The transaction information may include a portion or all of the information relevant to the transaction associated with the transaction request, such as the transaction request data, the transaction data, and/or the transaction confirmation data. In some implementations, the transaction information may include third party transaction data, e.g., information provided by a third party that is relevant to the transaction, such as a tax withholding calculation performed by a government entity. In some implementations, the transaction information may include data identifying one or more actions performed by the work data management platform (e.g., actions used to perform at least a portion of the transaction associated with the transaction request).

In some implementations, as shown by reference number 180, the work data management node that receives transaction information stores the transaction information in one or more distributed ledgers. For example, a portion or all of the transaction information may be stored in a distributed ledger associated with a working entity (e.g., indicating which blocks of work have been paid, updating amounts of credit associated with the working entity, and/or the like). As another example, a portion or all of the transaction information may be stored in a distributed ledger associated with an employing entity (e.g., indicating which working entity was paid, updating deposit account information, and/or the like). The manner in which the work data management node handles the storage of transaction information may depend upon the executable instructions (e.g., the smart contract) applicable to the transaction. For example, the work data management node may store transaction information in a new block of the distributed ledger, or add it as a transaction to an existing block of the distributed ledger.

In some implementations, the transaction information may include data that can be used by the work data management node to perform at least a portion of the transaction. For example, rather than the work data management platform performing the transaction, as described above associated with reference number 170, the work data management node may perform the transaction (e.g., by performing any of the actions described above as being performed by the work data management platform). By way of example, the work data management platform may broadcast transaction information to the network of work data management nodes, and one of the work data management nodes may receive the transaction information and process it in accordance with the executable instructions (e.g., the smart contract) associated with the distributed ledger, or blockchain, of the working entity associated with the transaction.

In some implementations, the work data management platform may perform one or more actions after the transaction has taken place. For example, as shown by reference number 185, the work data management platform may communicate with a third party device regarding third party transaction data, which may include any information relevant to the transaction and the third party. For example, the third party device may be a device associated with an organization providing payroll services to the employing entity associated with user device B, and the third party transaction data may include information relevant to providing payroll services to the employing entity. Other example third party devices may include devices associated with tax-related entities, currency conversion entities, banking entities, and/or the like.

While the example implementation 150 depicts the performance of a transaction based on the receipt of a transaction request, in some implementations, the work data management platform and/or work data management nodes may perform one or more actions associated with a transaction without receiving a distinct request. For example, the executable instructions (e.g., smart contract) associated with a distributed ledger may include triggering conditions that cause particular types of actions and/or transaction to occur, based on the occurrence of a triggering condition.

By way of example, the executable instructions may specify that credit is to be deposited into a deposit account associated with a working entity every two weeks (e.g., the triggering condition being the passage of two weeks), enabling the management of work data by the work data management platform to achieve a traditional payment distribution while taking advantage of the distributed, open, secure, and flexible nature of the work data management platform. As another example, the executable instructions may specify that credit is to be deposited into a deposit account after a particular amount of credit has been accrued. In some implementations, the executable instructions may specify that a portion of credit that exceeds a particular amount should be deposited into an investment account associated with the working entity, providing the working entity with control over distributions of credit in a flexible manner Another example triggering condition may include a triggering condition based on the type of work performed, e.g., the performance of one type of work might trigger one type of transaction, while the performance of a different type of work might trigger a different type of transaction. Triggering conditions may be created and/or updated by any entity authorized by the executable instructions (e.g., the smart contract) to do so, such as the working entity and/or an employing entity.

In this way, the work data management platform may facilitate the management of work data in a manner designed to be flexible, secure, distributed, open, and automated. For example, flexibility is provided by enabling various aspects of executable instructions (e.g., instructions executed by the work data management platform and/or work data management nodes, such as smart contracts) to be configured by various parties associated with a working entity, leading to a variety of different types of actions, transactions, and configurations to be handled by the work data management platform. Security is provided by implementing various forms of authentication, restricting access to a worker's distributed ledger (e.g., the worker's blockchain) to particular parties. Additionally, the distributed ledger may improve security, and preserve an immutable record of work data, by using cryptographic links between blocks of the distributed ledger, e.g., reducing the potential for unauthorized tampering with work data. The use of a distributed ledger improves security and transaction accuracy in implementations where a consensus between work data management nodes provides assurance that transactions are consistent and correctly performed. A distributed implementation also provides failover protection, in that the work data management platform may continue to operate in a situation where one or more work data management nodes fail. The open implementation makes distributed ledger data openly available to authorized parties, facilitating access to the work data in a manner designed to be open to at least some of the parties associated with the distributed ledgers.

As noted above, several different stages of the process for managing work data are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. Finally, automating the process for managing work data conserves computing resources (e.g., processor resources, memory resources, and/or the like) that would otherwise be wasted by using multiple different types of devices with different software, protocols, and configurations, and computing resources that would otherwise be wasted correcting problems that would arise from lack of consistency in the application of various transactions related to work data.

As indicated above, FIGS. 1A-1B are provided merely as an example. Other examples are possible and may differ from what was described with regard to FIGS. 1A-1B.

Figure 2:
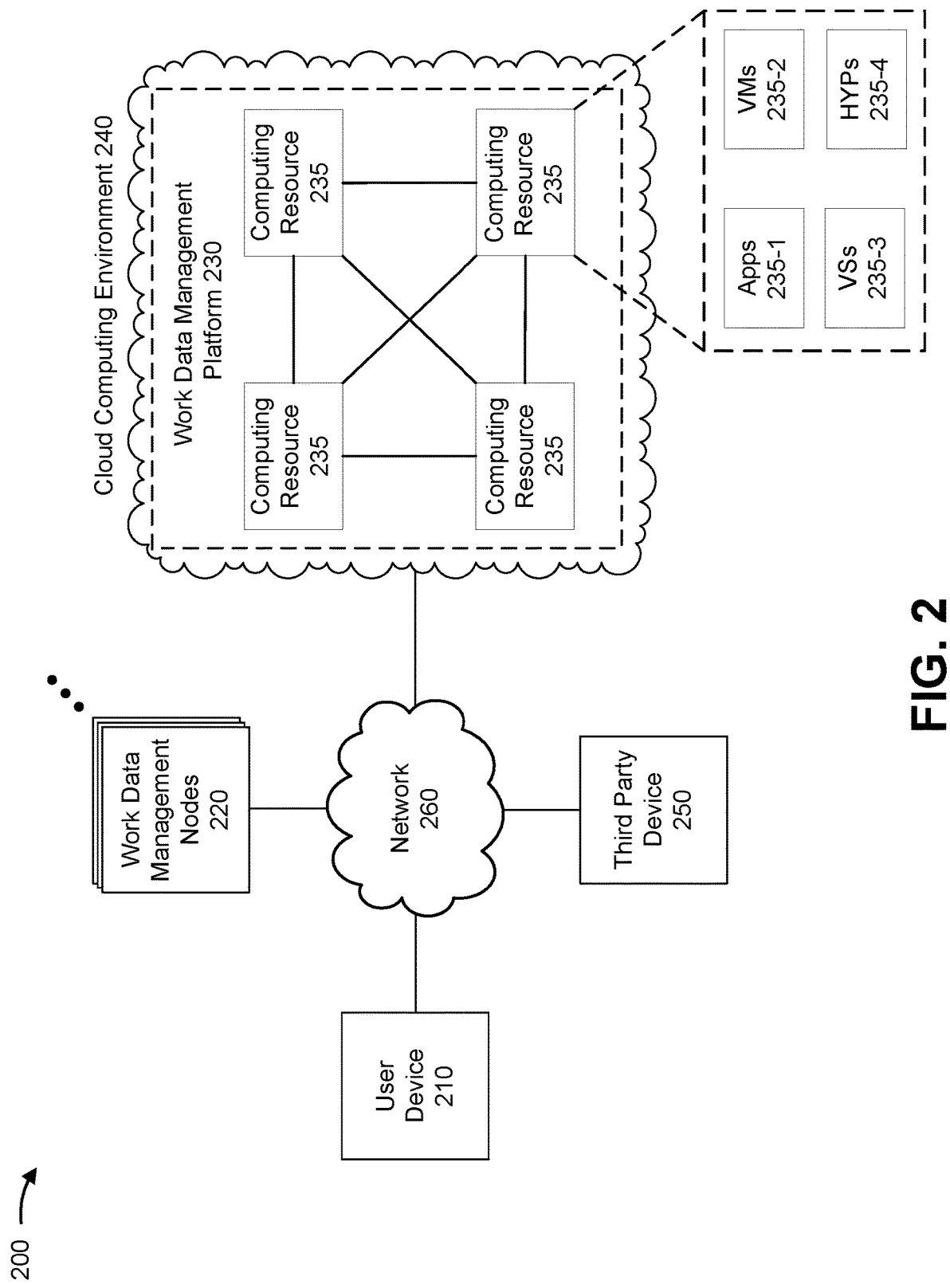
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, work data management nodes 220, a work data management platform 230, a computing resource 235, a cloud computing environment 240, a third party device 250, and a network 260. Devices of environment 200 may interconnect via wired connections, wireless connections, or a combination of wired and wireless connections.

User device 210 includes one or more devices capable of receiving, generating, storing, processing, and/or providing information associated with work data. For example, user device 210 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, user device 210 may include one or more applications designed to enable user device 210 to communicate with work data management nodes 220 and/or work data management platform 230.

Work data management nodes 220 include one or more devices capable of receiving, generating, storing, processing, and/or providing information associated with work data. For example, user device 210 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, work data management nodes 220 may be blockchain nodes implementing a blockchain network used to manage work data. For example, work data management nodes 220 may include executable instructions (e.g., smart contracts, such as Ethereum-based smart contracts) designed to enable work data management nodes 220 to perform a variety of actions related to work data management, including the management of distributed ledgers for working entities.

Work data management platform 230 includes one or more devices capable of receiving, generating, storing, processing, and/or providing information associated with work data. For example, work data management platform 230 may include a server device (e.g., a host server, a web server, an application server, etc.), a data center device, or a similar device. For example, work data management platform 230 may be capable of using an application programming interface (API) to provide an interface between user device 210, third party device 250, and work data management nodes 220. In this way, work data management platform 230 may perform one or more actions designed to manage work data, including actions designed to facilitate transactions associated with work data, including providing data to work data management nodes 220 in a manner designed to enable work data management nodes 220 to perform one or more actions designed to manage work data.

In some implementations, as shown, work data management platform 230 may be hosted in cloud computing environment 240. Notably, while implementations described herein describe work data management platform 230 as being hosted in cloud computing environment 240, in some implementations, work data management platform 230 might not be cloud-based (i.e., may be implemented outside of a cloud computing environment) or might be partially cloud-based.

Cloud computing environment 240 includes an environment that delivers computing as a service, whereby shared resources, services, etc. may be provided to user device 210, work data management nodes 220, third party device 250, and/or work data management platform 230. Cloud computing environment 240 may provide computation, software, data access, storage, and/or other services that do not require end-user knowledge of a physical location and configuration of a system and/or a device that delivers the services. As shown, cloud computing environment 240 may include a work data management platform 230 and a computing resource 235.

Computing resource 235 includes one or more personal computers, workstation computers, server devices, or another type of computation and/or communication device. In some implementations, computing resource 235 may host work data management platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with work data management platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Third party device 250 includes one or more devices capable of receiving, generating, storing, processing, and/or providing information associated with work data. For example, third party device 250 may include a communication and/or computing device, such as a mobile phone (e.g., a smart phone, a radiotelephone, etc.), a laptop computer, a tablet computer, a handheld computer, a server computer, a gaming device, a wearable communication device, or a similar type of device. In some implementations, third party device 250 may include one or more applications designed to enable third party device 250 to communicate with work data management platform 230.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
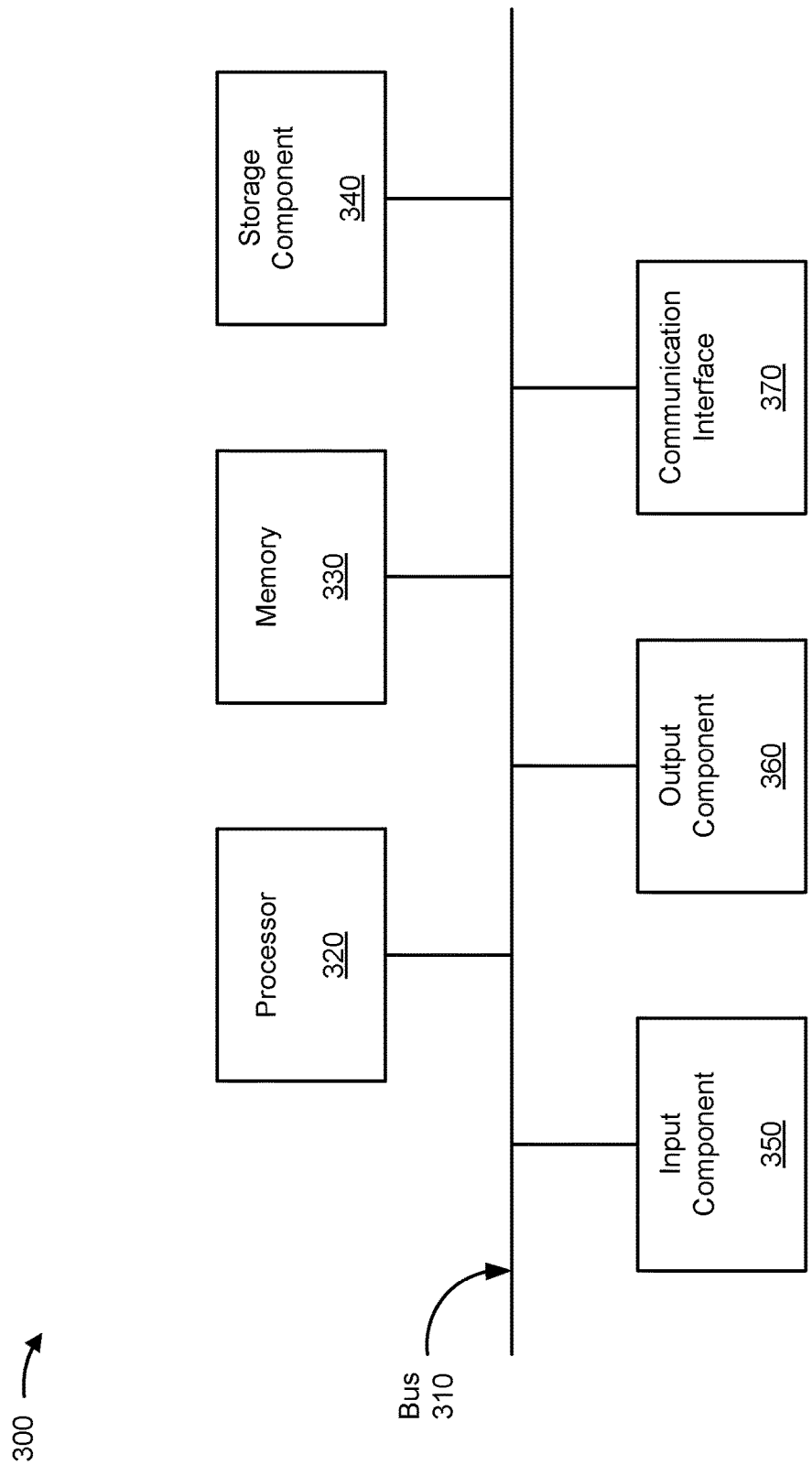
FIG. 3 is a diagram of example components of one or more devices of FIG. 2.

FIG. 3 is a diagram of example components of a device 300. Device 300 may correspond to user device 210, work data management nodes 220, work data management platform 230, computing resource 235, and/or third party device 250. In some implementations, user device 210, work data management nodes 220, work data management platform 230, computing resource 235, and/or third party device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
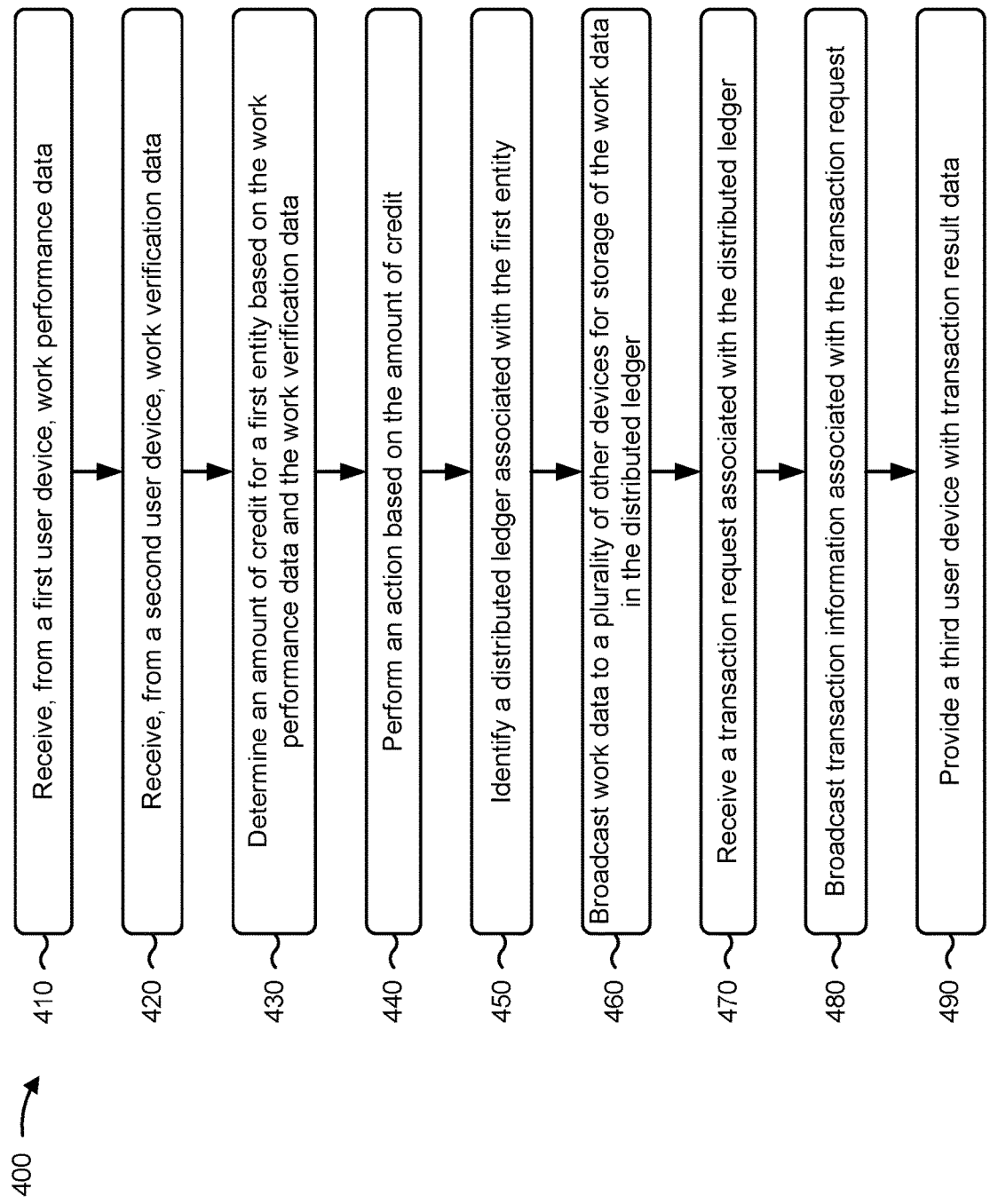
FIGS. 4-6 are flow charts of example processes for distributed management of work data.

FIG. 4 is a flow chart of an example process 400 for distributed management of work data. In some implementations, one or more process blocks of FIG. 4 may be performed by a work data management platform 230. In some implementations, one or more process blocks of FIG. 4 may be performed by another device or a group of devices separate from or including work data management platform 230, such as user device 210, work data management nodes 220, computing resource 235, and/or third party device 250.

As shown in FIG. 4, process 400 may include receiving, from a first user device, work performance data (block 410). For example, a work data management platform (e.g., work data management platform 230, using processor 320, memory 330, storage component 340, input component 350, communications interface 370, and/or the like) may receive, from a first user device, work performance data, the work performance data including information specifying work performed by a first entity associated with the first user device, as described, for example, in connection with FIGS. 1A and 1B.

As further shown in FIG. 4, process 400 may include receiving, from a second user device, work verification data (block 420). For example, the work data management platform (e.g., work data management platform 230, using processor 320, memory 330, storage component 340, input component 350, communications interface 370, and/or the like) may receive, from a second user device, work verification data, the work verification data including information verifying the work performed by the first entity, as described, for example, in connection with FIGS. 1A and 1B.

As further shown in FIG. 4, process 400 may include determining an amount of credit for a first entity based on the work performance data and the work verification data (block 430). For example, the work data management platform (e.g., work data management platform 230, using processor 320, memory 330, storage component 340, and/or the like) may determine an amount of credit for the first entity based on the work performance data and the work verification data, as described, for example, in connection with FIGS. 1A and 1B.

As further shown in FIG. 4, process 400 may include performing an action based on the amount of credit (block 440). For example, the work data management platform (e.g., work data management platform 230, using processor 320, memory 330, storage component 340, and/or the like) may perform an action based on the amount of credit, as described, for example, in connection with FIGS. 1A and 1B.

As further shown in FIG. 4, process 400 may include identifying a distributed ledger associated with the first entity (block 450). For example, the work data management platform (e.g., work data management platform 230, using processor 320, memory 330, storage component 340, and/or the like) may identify a distributed ledger associated with the first entity, as described, for example, in connection with FIGS. 1A and 1B.

As further shown in FIG. 4, process 400 may include broadcasting work data to a plurality of other devices for storage of the work data in the distributed ledger (block 460). For example, the work data management platform (e.g., work data management platform 230, using processor 320, memory 330, storage component 340, output component 360, communications interface 370, and/or the like) may broadcast work data to a plurality of other devices for storage of the work data in the distributed ledger, the work data including: information identifying the work performed by the first entity, information identifying a second entity associated with the second user device, the amount of credit for the first entity, and a result of the action, as described, for example, in connection with FIGS. 1A and 1B.

As further shown in FIG. 4, process 400 may include receiving a transaction request associated with the distributed ledger (block 470). For example, the work data management platform (e.g., work data management platform 230, using processor 320, memory 330, storage component 340, input component 350, communications interface 370, and/or the like) may receive, from a third user device associated with the first entity, a transaction request associated with the distributed ledger, as described, for example, in connection with FIGS. 1A and 1B.

As further shown in FIG. 4, process 400 may include broadcasting transaction information associated with the transaction request (block 480). For example, the work data management platform (e.g., work data management platform 230, using processor 320, memory 330, storage component 340, output component 360, communications interface 370, and/or the like) may broadcast, to the plurality of other devices, transaction information associated with the transaction request, the transaction information causing at least one of the plurality of other devices to: perform a transaction, and record the transaction in the distributed ledger, as described, for example, in connection with FIGS. 1A and 1B.

As further shown in FIG. 4, process 400 may include providing a third user device with transaction result data (block 490). For example, the work data management platform (e.g., work data management platform 230, using processor 320, memory 330, storage component 340, output component 360, communications interface 370, and/or the like) may provide the third user device with transaction result data specifying a result of performing the transaction, as described, for example, in connection with FIGS. 1A and 1B.

Process 400 may include additional implementations, such as any single implementation or any combination of implementations described below.

In some implementations, the first entity may be an individual. In some implementations, the first entity may be an organization.

In some implementations, the action is further based on executable instructions included in a smart contract associated with the device. In some implementations, the device is a work data management node included in a network with a plurality of other work data management nodes, the plurality of other work data management nodes including the plurality of other devices.

In some implementations, performing the action based on the amount of credit may include determining, for each account of a plurality of accounts associated with the first entity, a portion of the amount of credit that is to be allocated to the account.

In some implementations, performing the action based on the amount of credit may include determining a withholding amount based on withholding instructions associated with the first entity.

In some implementations, performing the action based on the amount of credit may include providing a third party device (e.g., third party device 250) with data specifying at least a portion of the amount of credit.

In some implementations, performing the action based on the amount of credit may include converting at least a portion of the amount of credit from a first currency into a second currency, the second currency being a cryptographic currency.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
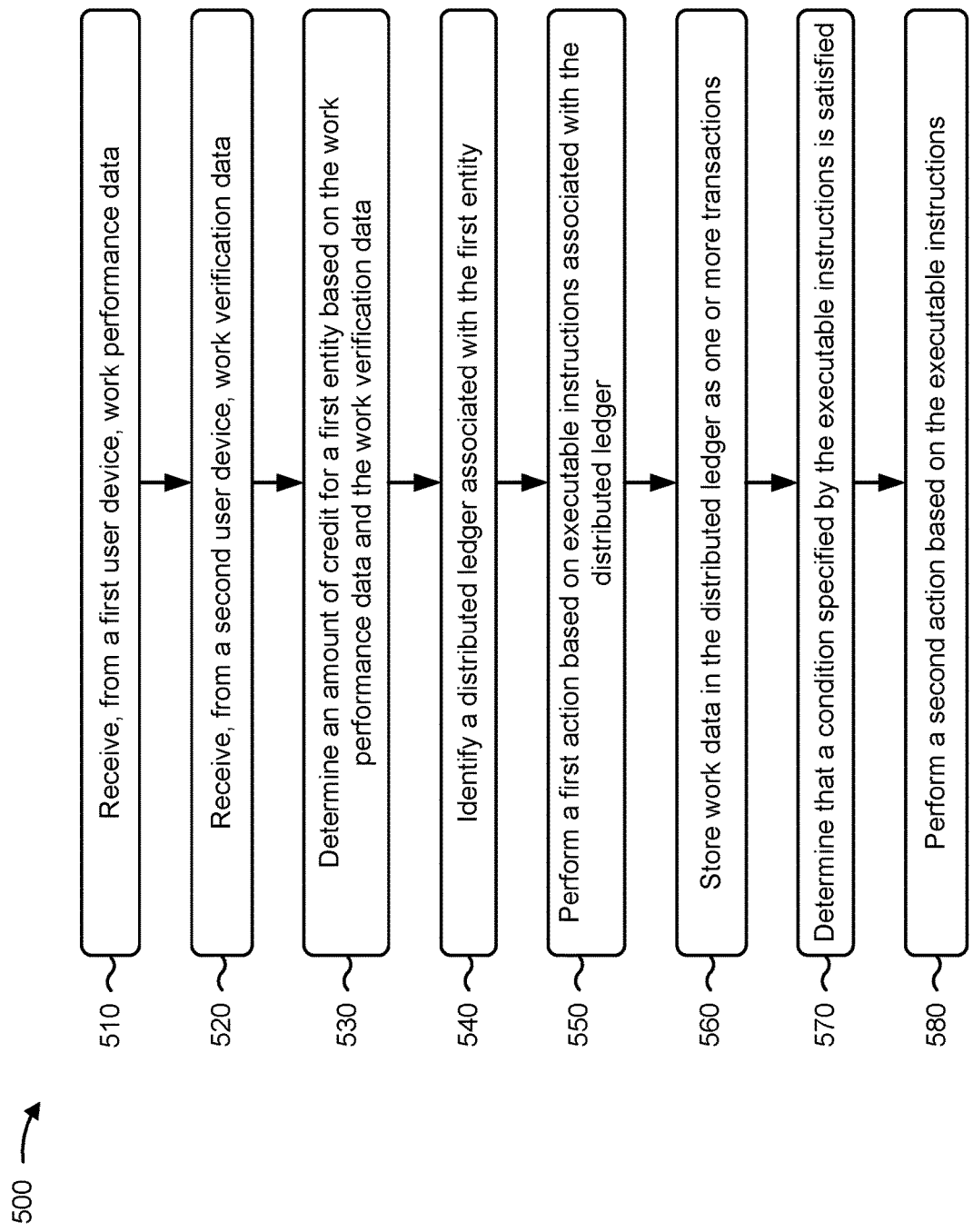

FIG. 5 is a flow chart of an example process 500 for distributed management of work data. In some implementations, one or more process blocks of FIG. 5 may be performed by a work data management node of work data management nodes 220. In some implementations, one or more process blocks of FIG. 5 may be performed by another device or a group of devices separate from or including work data management nodes 220, such as user device 210, work data management platform 230, computing resource 235, and/or third party device 250.

As shown in FIG. 5, process 500 may include receiving, from a first user device, work performance data (block 510). For example, a work data management node (e.g., one of work data management nodes 220, using processor 320, memory 330, storage component 340, input component 350, communications interface 370, and/or the like) may receive, from a first user device (e.g., user device 210), work performance data, the work performance data including information specifying work performed by a first entity associated with the first user device, as described, for example, in connection with FIGS. 1A and 1B.

As further shown in FIG. 5, process 500 may include receiving, from a second user device, work verification data (block 520). For example, the work data management node (e.g., one of work data management nodes 220, using processor 320, memory 330, storage component 340, input component 350, communications interface 370, and/or the like) may receive, from a second user device, work verification data, the work verification data including information verifying the work performed by the first entity, as described, for example, in connection with FIGS. 1A and 1B.

As further shown in FIG. 5, process 500 may include determining an amount of credit for a first entity based on the work performance data and the work verification data (block 530). For example, the work data management node (e.g., one of work data management nodes 220, using processor 320, memory 330, storage component 340, and/or the like) may determine an amount of credit for the first entity based on the work performance data and the work verification data, as described, for example, in connection with FIGS. 1A and 1B.

As further shown in FIG. 5, process 500 may include identifying a distributed ledger associated with the first entity (block 540). For example, the work data management node (e.g., one of work data management nodes 220, using processor 320, memory 330, storage component 340, and/or the like) may identify a distributed ledger associated with the first entity, as described, for example, in connection with FIGS. 1A and 1B.

As further shown in FIG. 5, process 500 may include performing a first action based on executable instructions associated with the distributed ledger (block 550). For example, the work data management node (e.g., one of work data management nodes 220, using processor 320, memory 330, storage component 340, input component 350, output component 360, communications interface 370, and/or the like) may perform a first action based on executable instructions associated with the distributed ledger, as described, for example, in connection with FIGS. 1A and 1B.

As further shown in FIG. 5, process 500 may include storing work data in the distributed ledger as one or more transactions (block 560). For example, the work data management node (e.g., one of work data management nodes 220, using processor 320, memory 330, storage component 340, and/or the like) may store work data in the distributed ledger as one or more transactions, the work data including: information identifying the work performed by the first entity, information identifying a second entity associated with the second user device, the amount of credit for the first entity, and a result of the first action, as described, for example, in connection with FIGS. 1A and 1B.

As further shown in FIG. 5, process 500 may include determining that a condition specified by the executable instructions is satisfied (block 570). For example, the work data management node (e.g., one of work data management nodes 220, using processor 320, memory 330, storage component 340, and/or the like) may determine that a condition specified by the executable instructions is satisfied, as described, for example, in connection with FIGS. 1A and 1B.

As further shown in FIG. 5, process 500 may include performing a second action based on the executable instructions (block 580). For example, the work data management node (e.g., one of work data management nodes 220, using processor 320, memory 330, storage component 340, input component 350, output component 360, communications interface 370, and/or the like) may perform a second action based on the executable instructions, as described, for example, in connection with FIGS. 1A and 1B.

Process 500 may include additional implementations, such as any single implementation or any combination of implementations described below.

In some implementations, when performing the first action based on executable instructions associated with the distributed ledger, the work data management node may transfer, to a first account associated with the first entity, the amount of credit from a second account associated with the second entity.

In some implementations, the work data management node may store, in the distributed ledger and as a transaction, result data that is based on the second action.

In some implementations, the work data management node may provide, to a plurality of other devices (e.g., other work data management nodes 220) that each stores a copy of the distributed ledger, data specifying the one or more transactions stored in the distributed ledger.

In some implementations, when determining the amount of credit for the first entity, the work data management node may determine the amount of credit further based on the executable instructions.

In some implementations, the condition may be a time condition satisfied by passage of a predetermined period of time, and the second action may include applying the amount of credit to an account associated with the first entity.

In some implementations, the condition may be a credit amount condition satisfied by accrual of a particular amount of credit, and the second action may include calculating a withholding amount associated with the particular amount of credit.

In some implementations, the condition may be satisfied by receipt of a transaction request, and the second action may include providing data associated with the transaction request to a third party device (e.g., third party device 250) associated with a third party.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
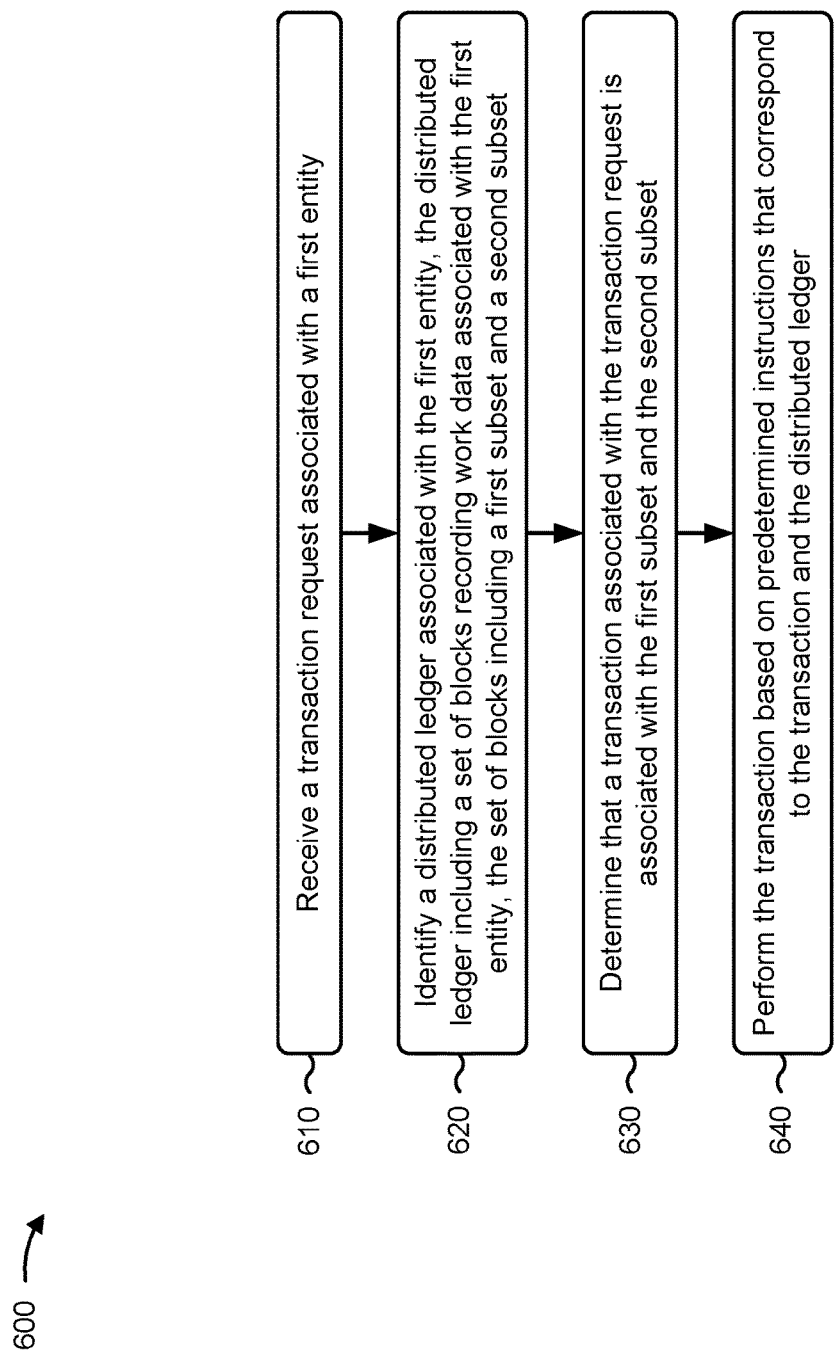

FIG. 6 is a flow chart of an example process 600 for distributed management of work data. In some implementations, one or more process blocks of FIG. 6 may be performed by a work data management node (e.g., one or more of work data management nodes 220). In some implementations, one or more process blocks of FIG. 6 may be performed by another device or a group of devices separate from or including one or more of the work data management nodes 220, such as user device 210, work data management platform 230, computing resource 235, and/or third party device 250.

As shown in FIG. 6, process 600 may include receiving a transaction request associated with a first entity (block 610). For example, a work data management node (e.g., one of work data management nodes 220, using processor 320, memory 330, storage component 340, input component 350, communications interface 370, and/or the like) may receive, from a user device (e.g., user device 210), a transaction request associated with a first entity, as described, for example, in connection with FIGS. 1A and 1B.

As further shown in FIG. 6, process 600 may include identifying a distributed ledger associated with the first entity, the distributed ledger including a set of blocks recording work data associated with the first entity, the set of blocks including a first subset and a second subset (block 620). For example, the work data management node (e.g., one of work data management nodes 220, using processor 320, memory 330, storage component 340, input component 350, output component 360, communications interface 370, and/or the like) may identify a distributed ledger associated with the first entity, the distributed ledger including a set of blocks recording work data associated with the first entity, as described, for example, in connection with FIGS. 1A and 1B. The set of blocks may include: a first subset of blocks, of the set of blocks, including data specifying work performed by the first entity, and a second subset of blocks, of the set of blocks, including data verifying a portion of the work performed by the first entity and specified by the data included in the first subset of blocks.

As further shown in FIG. 6, process 600 may include determining that a transaction associated with the transaction request is associated with the first subset and the second subset (block 630). For example, the work data management node (e.g., one of work data management nodes 220, using processor 320, memory 330, storage component 340, and/or the like) may determine that a transaction, associated with the transaction request, is associated with the first subset of blocks and the second subset of blocks, as described, for example, in connection with FIGS. 1A and 1B.

As further shown in FIG. 6, process 600 may include performing the transaction based on predetermined instructions that correspond to the transaction and the distributed ledger (block 640). For example, the work data management node (e.g., one of work data management nodes 220, using processor 320, memory 330, storage component 340, input component 350, output component 360, communications interface 370, and/or the like) may perform the transaction based on predetermined instructions that correspond to the transaction and the distributed ledger, as described, for example, in connection with FIGS. 1A and 1B.

Process 600 may include additional implementations, such as any single implementation or any combination of implementations described below.

In some implementations, the transaction may be a transfer of credit to an account associated with the first entity, and the predetermined instructions cause the one or more processors to transfer an amount of credit associated with the second subset of blocks.

In some implementations, the work data management node may store, in the distributed ledger, transaction data associated with performance of the transaction in the distributed ledger and provide, to a plurality of devices (e.g., other work data management nodes 220) that each stores a copy of the distributed ledger, the transaction data.

In some implementations, the work data management node may receive, from a second device (e.g., user device 210), a request to access information stored in the distributed ledger, determine that the second device is authorized to access the information stored in the distributed ledger, and provide, based on the request, the second device with access to the information stored in the distributed ledger.

In some implementations, each block, included in the set of blocks, includes a pointer to a prior block of the set of blocks, the pointer being cryptographically generated.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the work data management platform 230 may facilitate the management of work data in a manner designed to be flexible, secure, distributed, open, and automated. For example, flexibility is provided by enabling various aspects of executable instructions (e.g., instructions executed by the work data management platform 230 and/or work data management nodes 220, such as smart contracts) to be configured by various parties associated with a worker, leading to a variety of different types of transactions and configurations to be handled by the work data management platform 230. Security is provided by implementing various forms of authentication, restricting access to a worker's distributed ledger (e.g., the worker's blockchain) to particular parties. Additionally, the distributed ledger may improve security, and preserve an immutable record of work data, by using cryptographic links between blocks of the distributed ledger, e.g., reducing the potential for unauthorized tampering with work data. The use of a distributed ledger improves security and transaction accuracy in implementations where a consensus between work data management nodes 220 provides assurance that transactions are consistent and correctly performed. A distributed implementation also provides failover protection, in that the work data management platform 230 may continue to operate in a situation where one or more work data management nodes 220 fail. The open implementation makes distributed ledger data openly available to authorized parties, facilitating access to the work data in a manner designed to be open to at least some of the parties associated with the distributed ledgers.

Several different stages of the process for managing work data are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. Finally, automating the process for managing work data conserves computing resources (e.g., processor resources, memory resources, and/or the like) that would otherwise be wasted by using multiple different types of devices with different software, protocols, and configurations, and computing resources that would otherwise be wasted correcting problems that would arise from lack of consistency in the application of various transactions related to work data.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a platform device and from a first device, work performance data associated with a first entity;
   receiving, by the platform device and from a second device, work verification data associated with the first entity;
     wherein the work verification data is provided based on at least one of:
       a particular period of time being passed, or
       a particular amount of credit being accrued for the first entity;
   determining, by the platform device, an amount of credit for the first entity based on the work performance data and the work verification data; and
   updating, by the platform device, a blockchain associated with the first entity.

2. The method of claim 1, further comprising:
   performing an action based on executable instructions included in a smart contract associated with the platform device.

3. The method of claim 2, wherein data associated with the action includes information identifying work performed by the first entity.

4. The method of claim 1, further comprising:
   receiving a transaction request associated with the blockchain,
     wherein information associated with the transaction request causes recordation of processing the transaction request in the blockchain.

5. The method of claim 1, further comprising:
   receiving a transaction request associated with the blockchain; and
   broadcasting, to a plurality of blocks associated with the blockchain, data associated with processing the transaction request.

6. The method of claim 1, wherein the work verification data includes information verifying work performed by the first entity.

7. The method of claim 1, wherein the blockchain includes a first set of blocks associated with data specifying work performed by the first entity and a second set of blocks associated with data verifying a portion of the work performed by the first entity.

8. A device, comprising:
   one or more memories; and
   one or more processors, coupled to the one or more memories, configured to:
     receive work performance data associated with a first entity;
     receive work verification data associated with the first entity;
       wherein the work verification data is provided based on at least one of:
         a particular period of time being passed, or
         a particular amount of credit being accrued for the first entity;
     determine a credit for the first entity based on the work performance data and the work verification data; and
     update a blockchain associated with the first entity.

9. The device of claim 8, wherein the one or more processors are further configured to:
   perform an action based on executable instructions included in a smart contract associated with the device.

10. The device of claim 9, wherein data associated with the action includes information identifying work performed by the first entity.

11. The device of claim 8, wherein the one or more processors are further configured to:
- receive a transaction request associated with the blockchain,
  - wherein information associated with the transaction request causes recordation of processing the transaction request in the blockchain.

12. The device of claim 8, wherein the one or more processors are further configured to:
- receive a transaction request associated with the blockchain; and
- broadcast, to a plurality of blocks associated with the blockchain, data associated with processing the transaction request.

13. The device of claim 8, wherein the work verification data includes information verifying work performed by the first entity.

14. The device of claim 8, wherein the blockchain includes a first set of blocks associated with data specifying work performed by the first entity and a second set of blocks associated with data verifying a portion of the work performed by the first entity.

15. A non-transitory computer-readable medium storing a set of instructions, the set of instructions comprising:
- one or more instructions that, when executed by one or more processors of a device, cause the device to:
  - receive work performance data associated with a first entity;
  - receive work verification data associated with the first entity;
    - wherein the work verification data is provided based on at least one of:
      - a particular period of time being passed, or
      - a particular amount of credit being accrued for the first entity;
  - determine a credit for the first entity based on the work performance data and the work verification data; and
  - update a blockchain associated with the first entity.

16. The non-transitory computer-readable medium of claim 15, wherein the one or more instructions further cause the device to:
- perform an action based on executable instructions included in a smart contract associated with the device.

17. The non-transitory computer-readable medium of claim 16, wherein data associated with the action includes information identifying work performed by the first entity.

18. The non-transitory computer-readable medium of claim 15, wherein the one or more instructions further cause the device to:
- receive a transaction request associated with the blockchain,
  - wherein information associated with the transaction request causes recordation of processing the transaction request in the blockchain.

19. The non-transitory computer-readable medium of claim 15, wherein the one or more instructions further cause the device to:
- receive a transaction request associated with the blockchain; and
- broadcast, to a plurality of blocks associated with the blockchain, data associated with processing the transaction request.

20. The non-transitory computer-readable medium of claim 15, wherein the work verification data includes information verifying work performed by the first entity.

\* \* \* \* \*